US009600832B2

(12) United States Patent
Zhou

(10) Patent No.: US 9,600,832 B2
(45) Date of Patent: Mar. 21, 2017

(54) SYSTEMS AND METHODS FOR DIGITAL MULTIMEDIA CAPTURE USING HAPTIC CONTROL, CLOUD VOICE CHANGER, PROTECTING DIGITAL MULTIMEDIA PRIVACY, AND ADVERTISING AND SELL PRODUCTS OR SERVICES VIA CLOUD GAMING ENVIRONMENTS

(71) Applicant: Dylan T X Zhou, Tiburon, CA (US)

(72) Inventor: Dylan T X Zhou, Tiburon, CA (US)

( * ) Notice: Subject to any disclaimer, the term of this patent is extended or adjusted under 35 U.S.C. 154(b) by 0 days.

(21) Appl. No.: 15/081,600

(22) Filed: Mar. 25, 2016

(65) Prior Publication Data
US 2016/0225019 A1 Aug. 4, 2016

Related U.S. Application Data

(63) Continuation-in-part of application No. 14/815,988, filed on Aug. 1, 2015, now Pat. No. 9,342,829, which
(Continued)

(51) Int. Cl.
*G06Q 30/02* (2012.01)
*G06Q 20/32* (2012.01)
(Continued)

(52) U.S. Cl.
CPC ..... *G06Q 30/0251* (2013.01); *G06Q 20/3274* (2013.01); *G06Q 20/3276* (2013.01);
(Continued)

(58) Field of Classification Search
CPC ........... G06Q 30/0251; G06Q 30/0209; G06Q 30/0273; G06Q 30/02; G06Q 20/3276;
(Continued)

(56) References Cited
U.S. PATENT DOCUMENTS

| 9,342,829 | B2* | 5/2016 | Zhou | G06Q 30/02 |
| 2008/0139306 | A1* | 6/2008 | Lutnick | G06Q 30/02 463/30 |
| 2008/0155019 | A1* | 6/2008 | Wallace | A63F 13/12 709/204 |
| 2009/0240586 | A1* | 9/2009 | Ramer | G06F 17/30905 705/14.64 |
| 2012/0059699 | A1* | 3/2012 | Zhou | G06Q 30/02 705/14.12 |
| 2012/0130822 | A1* | 5/2012 | Patwa | G06Q 30/0273 705/14.69 |
| 2012/0190386 | A1* | 7/2012 | Anderson | G01C 15/04 455/456.3 |
| 2012/0284100 | A1* | 11/2012 | Goldberg | G06Q 30/02 705/14.19 |
| 2012/0308192 | A1* | 12/2012 | Chung | H04N 21/44218 386/230 |
| 2012/0309511 | A1* | 12/2012 | Chung | H04N 21/274 463/30 |
| 2012/0309515 | A1* | 12/2012 | Chung | H04N 21/274 463/31 |
| 2013/0005471 | A1* | 1/2013 | Chung | A63F 13/12 463/42 |
| 2013/0053142 | A1* | 2/2013 | Kress | A63F 13/65 463/31 |
| 2014/0073410 | A1* | 3/2014 | Ramos | A63F 13/00 463/25 |
| 2014/0098758 | A1* | 4/2014 | Cheng | H04L 47/10 370/329 |
| 2014/0189354 | A1* | 7/2014 | Zhou | G06Q 30/02 713/168 |
| 2015/0066613 | A1* | 3/2015 | Zhou | G06Q 30/0209 705/14.12 |
| 2015/0193814 | A1* | 7/2015 | Eppinger | G06Q 30/0277 705/14.41 |

(Continued)

*Primary Examiner* — Daniel Walsh
(74) *Attorney, Agent, or Firm* — Steven A. Nielsen; www.NielsenPatents.com

(57) ABSTRACT

Provided is a method for advertising and retailing products and services in cloud gaming environments. A game provider may configure its cloud gaming environment to display third party advertisement before, during, or after the game. The advertisement may be in the form of timeout screens, banners, gaming objects, prizes, and other forms associated with typical cloud gaming environments. Third party advertisers benefit from additional advertisement exposure in these cloud gaming environments, which tend to be dynamic and interactive, and target new audience. Advertisement interaction levels may be measure to determine effectiveness and, for example, to collect certain fees from advertisers. An interaction level of interaction may be determined based on a number of clicks on advertisement objects, duration of exposure to the advertisement, a number of players, and various other factors. Game providers may modify their cloud gaming environments to improve these interaction levels and, as a result, collect more.

26 Claims, 4 Drawing Sheets

Related U.S. Application Data is a continuation-in-part of application No. 14/034,509, filed on Sep. 23, 2013, now Pat. No. 9,510,277.

(60) Provisional application No. 60/415,546, filed on Oct. 1, 2002.

(51) Int. Cl.
| | |
|---|---|
| *G06Q 20/38* | (2012.01) |
| *G06Q 20/40* | (2012.01) |
| *G10L 13/02* | (2013.01) |
| *G10L 15/20* | (2006.01) |
| *H04L 29/06* | (2006.01) |

(52) U.S. Cl.
CPC ....... *G06Q 20/3829* (2013.01); *G06Q 20/401* (2013.01); *G06Q 30/02* (2013.01); *G06Q 30/0209* (2013.01); *G06Q 30/0273* (2013.01); *G10L 13/02* (2013.01); *G10L 15/20* (2013.01); *H04L 65/1006* (2013.01); *G06Q 2220/00* (2013.01)

(58) Field of Classification Search
CPC ............. G06Q 20/3829; G06Q 20/401; G06Q 2220/00; G10L 13/02; G10L 15/20; H04L 65/1006
See application file for complete search history.

(56) References Cited

U.S. PATENT DOCUMENTS

2015/0371215 A1\* 12/2015 Zhou ...................... G06Q 30/02
 705/71
2016/0225019 A1\* 8/2016 Zhou .................. G06Q 20/3274

\* cited by examiner

SYSTEMS AND METHODS FOR DIGITAL MULTIMEDIA CAPTURE USING HAPTIC CONTROL, CLOUD VOICE CHANGER, PROTECTING DIGITAL MULTIMEDIA PRIVACY, AND ADVERTISING AND SELL PRODUCTS OR SERVICES VIA CLOUD GAMING ENVIRONMENTS

RELATED PATENT APPLICATION AND INCORPORATION BY REFERENCE

This application is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which is a continuation-in-part of U.S. patent application Ser. No. 14/034,509, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 23, 2013, which is continuation of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to U.S. Provisional Patent Application No. 60/415,546, entitled "DATA PROCESSING SYSTEM", filed on Oct. 1, 2002, which are incorporated herein by reference in their entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

FIELD OF THE INVENTION

This application relates generally to internet advertising and, more specifically, to methods and systems computer for advertising and selling products and services via cloud gaming environments.

BACKGROUND

With the development and widespread of the Internet, many new forms of entertainment and business practices came to existence. A few examples include online gaming and internet marketing. An online game is a game played by one or more players over some form of computer network. This generally involves the Internet or equivalent technology. The expansion of online gaming has reflected the overall expansion of computer networks from small local networks to the Internet and the growth of Internet access itself. Online games can range from simple text based games to games incorporating complex graphics and virtual worlds populated by many players simultaneously. Many online games have associated online communities, making online games a form of social activity beyond single player games.

BRIEF SUMMARY OF THE INVENTION

The rising popularity of Flash and Java led to development of websites that could utilize streaming video, audio, and a whole new set of user interactivity. This in turned allowed for game providers to offer games to various users. Some online games, such as World of Warcraft, Final Fantasy, and Lineage, charge a monthly fee to subscribe to their services, while others, such as Guild Wars, offer other alternatives with no monthly fee scheme. Many other sites relied on advertising revenues from on-site sponsors, while others, like RuneScape, or Tibia let people play free of charge while leaving the players the option of paying, unlocking new content for the members. Still collecting revenues from their users continues to be a major issue of game providers.

Internet marketing, also known as digital marketing, web marketing, online marketing, search marketing or e-marketing, is referred to as the marketing (generally promotion) of products or services over the Internet. Internet marketing is a broad term and it not only refers to marketing on the Internet, but also includes marketing done via e-mail and wireless media. Internet marketing ties together the creative and technical aspects of the Internet, including design, development, advertising, and sales. Internet marketing also refers to the placement of media along many different stages of the customer engagement cycle through search engine marketing (SEM), search engine optimization (SEO), banner ads on specific websites, email marketing, mobile advertising, and Web 2.0 strategies. Yet internet marketing is generally not present or fully developed in many online cloud gaming environments.

SUMMARY

Provided are methods and systems for advertising and retailing products and services in various cloud gaming environments. A game provider may configure its cloud gaming environment to display third party advertisement before, during, or after the game. The advertisement may be in the form of timeout screens, banners, gaming objects, prizes, and other forms associated with typical cloud gaming environments. Third party advertisers benefit from additional advertisement exposure in these cloud gaming environments, which tend to be dynamic and interactive, and target new audience. Advertisement interaction levels may be measure to determine effectiveness and, for example, to collect certain fees from advertisers. An interaction level of interaction may be determined based on a number of clicks on advertisement objects, duration of exposure to the advertisement, a number of players, and various other factors. Game providers may modify their cloud gaming environments to improve these interaction levels and, as a result, collect more.

In certain embodiments, a method for advertising a product or service within a cloud gaming environment involve providing a gaming software configured to display a third party advertisement in the cloud gaming environment. The third party advertisement may be associated with a product or service provided by a third party. The method may also involve receiving one or more requests from one or more users to activate the gaming software, displaying the third party advertisement associated with the product or service, and identifying an interaction level of the one or more users with the third party advertisement while the one or more users interact with the cloud gaming environment. The method may also involve determining a fee payable by a third party based on the interaction level of the one or more users with the third party advertisement.

An interaction level may be determined based on a number of times users clicked on or otherwise selected fields associated with the third party advertisement and/or a number of times users observe one or more corresponding player objects interacting with the one or more fields associated with the third party advertisement. Other factors may include a number of times users sought additional advertisement information, a duration users' presence in the cloud gaming environment, a number of users, and a number of purchases of the product or service completed by the users. In certain embodiments, one or more factors are assigned individual weights used to determine the overall interaction level. An interaction level may be a single value determined based on one or more values corresponding to one or more factors. In other embodiments, an interaction level includes multiple factors such that each of these multiple factors is independently evaluated to determine the payable fee. For example, the payable fee may be determined based on a predetermined percentage of a gross purchase value completed by users. In certain embodiments, the third party advertisement includes interactive gaming objects. In the same or other embodiments, the third party advertisement includes a timed screen displayed in the cloud gaming environment in between two gaming intervals.

The method may involve identifying a winner among users and awarding the winner a prize associated with the product or service. The winner may be a user with a highest interaction level with the third party advertisement or some random methods. The fee payable by the third party may be determined based on a value of the prize. In certain embodiments, the value of the prize is determined based on a user individual interaction level with the third party advertisement. The prize may be a product item or service associated with the third party advertisement e.g., a product item or service depicted in the commercial. The prize may include a discount applicable to any one of a plurality of products and/or services associated with the third party advertisement. For example, a winner may not like a particular product or service shown during the game in the advertisement. However, he or she may still like to purchase some other products from this supplier. Therefore, the supplier may offer a range of products or service to the user to choose from.

In certain embodiments, the method involves accepting the one or more requests from users based on each user previous interaction with the third party advertisement. The method may also involve removing a user from the cloud gaming environment if the user does not meet a predetermined interaction level with the third party advertisement. In certain embodiments, the cloud gaming environment is initiated upon reaching a certain minimal predetermined number of requests from the one or more users to activate the gaming software. In these embodiments, the third party advertisement may be displayed prior to initiating the same environment.

The method may also involve providing a user interface to users indicating mutually exclusive options such as buying the product or service and entering the cloud gaming environment to win the product or service. In certain embodiments, users are charged a fee for entering the cloud gaming environment to win the product or service. The fee may correspond to a portion of a value of the product item or a service associated with the third party advertisement. For example, if ten players subscribed to the same gaming session, then a game provider may request each user to contribute a tenth of the prize value or some other amount. In certain embodiments, a portion of the prize value may be subsidized by the third party advertisement provider. In other embodiments, the only cost of the third party is payable to the game provider for its services and costs for game prizes are covered by the players. At the end of the game, a winner may be offered a refund of the initial fee as an additional incentive to do well during the game and, for example, to interact more with the third party advertisement. In certain embodiments, a portion of the fee may be paid to a game provider.

Provided also is a computer-readable medium including instructions, which are executed by one or more processors to perform various operations listed above. Provided also is a computer system for advertising a product or service within a cloud gaming environment. The system may include a processing module for providing gaming software configured to display a third party advertisement in a cloud gaming environment. The third party advertisement is associated with a product or service provided by a third party. The processing module may be also used for identifying an interaction level of one or more users with the third party advertisement while one or more users interact with the cloud gaming environment and for determining a fee payable by a third party based on the interaction level of the one or more users with the third party advertisement. In certain embodiments, a computer system also includes an input module for receiving one or more requests from the one or more users to activate the gaming software and an output module for displaying the third party advertisement associated with the product or service.

These and other embodiments are described further below with reference to the figures.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EMBODIMENTS OF THE INVENTION

Figure 1:
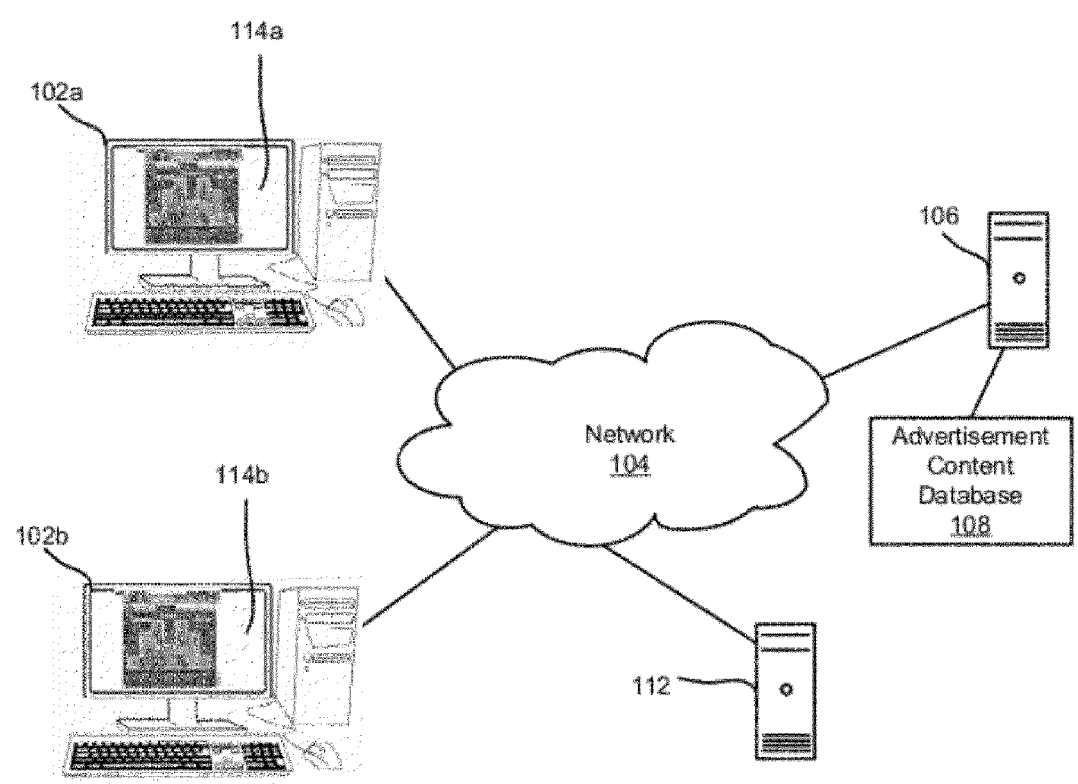
FIG. 1 is a block diagram illustrating an example of the overall system for implementing a cloud gaming environment, in accordance with various embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Provided are methods and systems for advertising and retailing products and services in various cloud gaming environments. In general, these methods and systems are designed promote, display, advertise, purchase products and services available from third party providers, e.g., retail merchants, hosting companies, third party advertisement companies, such as Google or Facebook.

Cloud gaming, also called gaming on demand, is a type of online gaming that allows direct and on-demand streaming of games onto a computer through the use of a thin client, in which the actual game is stored on the operator's or game company's server and is streamed directly to computers accessing the server through the client. This allows access to games without the need of a console and largely makes the capability of the user's computer unimportant, as the server is the system that is running the processing needs. The controls and button presses from the user are transmitted directly to the server, where they are recorded, and the server then sends back the game's response to the input controls. This process works swiftly without notable latency allowing interactive high action game play.

Nowadays, many Internet users enjoy playing online games vial cloud gaming. Likewise, many Internet users are active online shoppers and are being exposed to various online advertisements. When a user enters a cloud gaming environment, he or she tends to ignore surrounding fields on the screen and focus on the game itself. The online games are often very dynamic and require lots of focus from the gamers. At the same time, online games usually involve multiple people and can have some kind of rewards at the end. Integrating online advertisement content into a cloud gaming environment and making a part of the game provides additional opportunities to third party advertisers that were not previously available when these two modes existed in parallel. Specifically, these methods and systems described herein provide a game interface corresponding to a cloud gaming environment that allows users to play the game in addition to being exposed to various forms of advertisement corresponding to products or services.

A game provider may configure its cloud gaming environment to display third party advertisement before, during, or after the game. The advertisement may be in the form of timeout screens, banners, gaming objects, prizes, and other forms associated with typical cloud gaming environments. Third party advertisers benefit from additional advertisement exposure in these cloud gaming environments, which tend to be dynamic and interactive, and target new audience. Advertisement interaction levels may be measure to determine effectiveness and, for example, to collect certain fees from advertisers. An interaction level of interaction may be determined based on a number of clicks on advertisement objects, duration of exposure to the advertisement, a number of players, and various other factors. Game providers may modify their cloud gaming environments to improve these interaction levels and, as a result, collect more. Various operations and techniques involved will now be briefly described.

A gaming software provides a game interface for one or more users, which is sometimes referred herein as a cloud gaming environment. The cloud gaming environment is accessed by one or more users to play the game. This environment is also used to present product and service advertisement using various advertising objects. For example, various multimedia (e.g., text, video, audio, animation, image, flash, and pop up) may be used for this purpose. The gaming software and associated interfaces for integrating and displaying third party interfaces may be coded using one or more of the following programming languages: ALGOL 68, C, C++, C#, .Net, Java, Go, D, Objective-C, Common Lisp, Scheme, Pascal, Visual Basic, Visual Basic .NET, Perl, Perl 6, Python, JavaScript, S-Lang, Fortran, Ruby, Windows PowerShell, OCaml, F#, Standard ML, Haskell, Eiffel, and/or HTML. The games may be played using various operating systems, such as Mac OS, iOS, Unix, Google Chrome OS, Android, iRMX, LynxOS, Windows, Xbox, BlackBerry OS, webOS, PalmOS, Symbian.

One or more users send their requests to enter the cloud gaming environment. They may be immediately allowed into the environment or asked to wait until, for example, a predetermined number of players is pooled for a multiplayer game. This delay period may be also used for displaying some advertisement content. Furthermore, requests to enter the gaming requirement may come from users selecting a particular option while, for example, doing online shopping. For example, upon selecting a particular product item or service, the user may be presented with an option to buy it or play for it (i.e., win it) in the online game. The incentive for the user us to get this product or service for free or, for example, receive a coupon. At the same time, the incentive for the product or service provider is to expose this and possibly other users to various advertisement content. Winning of the game may decide by game activities, for example, by hitting advertisement objects present in the cloud gaming environment using weapons, moving objects, or some other interactive techniques. For example, obstacle and/or targets in the cloud gaming environment may include various advertisement content. Winning the game may also involve negotiation, lobby, blackmail, body fighting, fighting with stones or sword, using rifle or machine gun, using tank or warship, using bombs, and other interactive techniques to win the prize, which may correspond to the advertised product or service.

A provider of the cloud gaming environment may receive a fee from the third party advertiser for exposing one or more users to the advertisement content provided in this environment. The payable fee may be determined based on the interaction level of these users with the advertisement content. In certain embodiments, a fee may represent a percentage (e.g., 0.01%-20%) of the sales of the product or service initiated directly from the cloud gaming environment. However, various other schemes of determining payable amount can be used as well.

Figure 2:
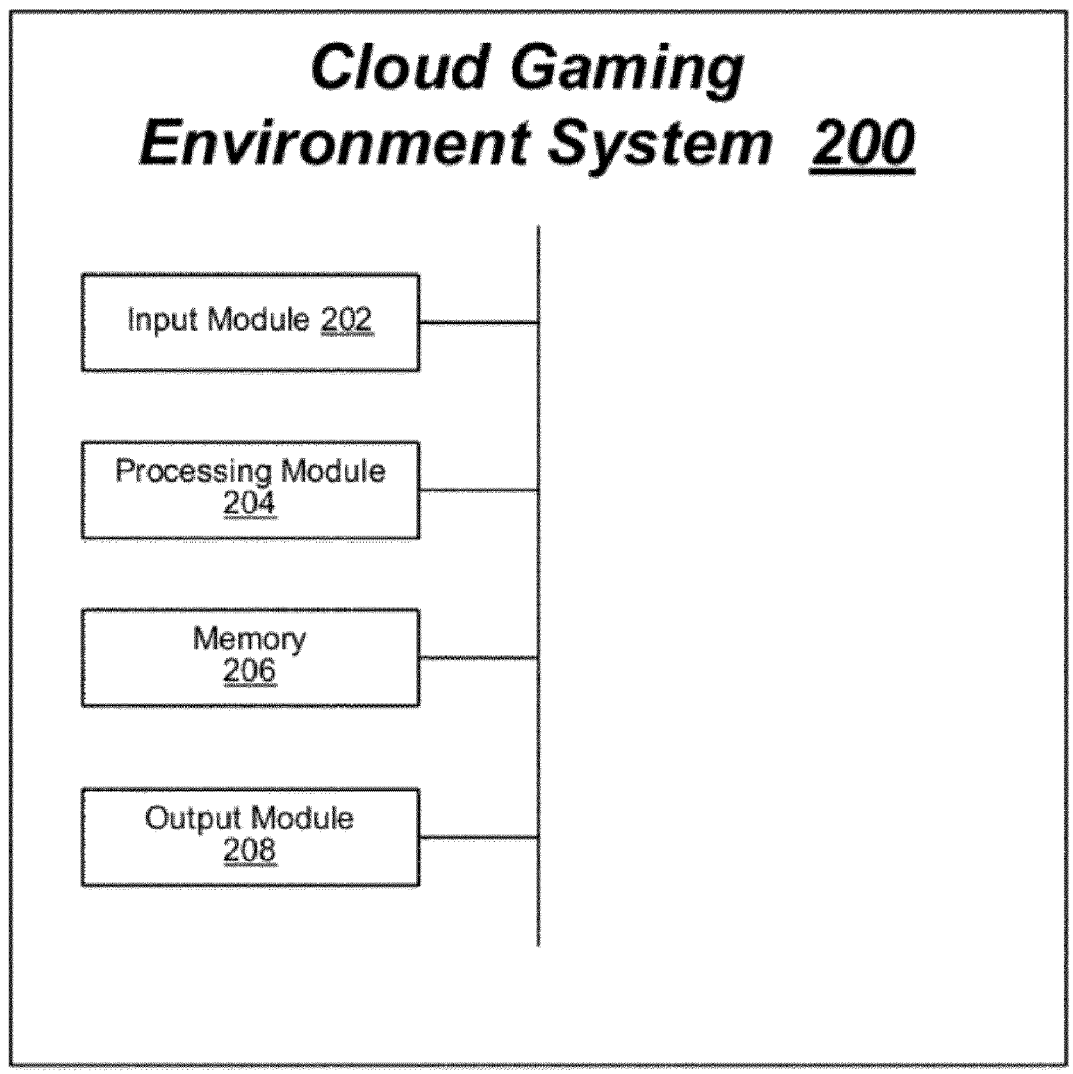
FIG. 2 is a block diagram showing various modules of the computer system for advertising products and services within a cloud gaming environment, in accordance with certain embodiments.

Before describing various methods and associated operations, a brief description of a computer network. Specifically, FIG. 1 illustrates an example network segment for implementing various aspects of methods and operations for advertising products and services within a cloud gaming environment. As shown, multiple user systems 102 *a* and 102 *b* may be configured to display gaming interfaces 114 *a* and 114 *b*. One example of such gaming interface is presented in FIG. 5 and further described below. Some examples of user systems include computers, laptops, tablets, mobile devices, cell phones, etc. User systems 102 *a* and 102 *b* communicate with gaming server 106 via network 104. Gaming server 106 is a part of the cloud gaming environment system, which may include advertisement content database 108. A third party advertisement server 112 may be also connected to the network for interacting with the gaming server 106 or even directly with user systems 102 *a* and 102 *b*. For example, instead of having a separate gaming server as shown in FIG. 2, a third party advertisement server may be used to provide cloud gaming environment. For example, a third party advertisement server may download game software to their own server and provide cloud gaming environment through their own website. Once the gaming software is downloaded to the third party advertisement server, it may be modified to integrate images or other media forms of the product or service into game interface. The game software provider may sell this gaming software outright or rent it to one or more third party advertisement providers for a fee.

Network 104 that is used for communicating user systems 102 a and 102 b, gaming server 106, and third party advertisement server 112 may take any suitable form, such as a wide area network or Internet and/or one or more local area networks (LAN's). The network 104 may include any suitable number and type of devices, e.g., routers and switches, for forwarding commands, content, and/or web object requests from each client to the online community application and responses back to the clients.

The methods describe herein may also be practiced in a wide variety of network environments (represented by network 104) including, for example, TCP/IP-based networks, telecommunications networks, wireless networks, etc. In addition, the computer program instructions may be stored in any type of computer-readable media. The program may be executed according to a variety of computing models including a client/server model, a peer-to-peer model, on a stand-alone computing device, or according to a distributed computing model in which various functionalities described herein may be effected or employed at different locations.

FIG. 2 is one example of the cloud gaming environment system 200 that may be used for advertising products and services within a cloud gaming environment. The cloud gaming environment system 200 may be implemented, for example, on a gaming server (component 106 in FIG. 1) or some other forms of computer systems. The cloud gaming environment system 200 may include an input module 202 for receiving one or more requests from the one or more users to activate the gaming software. Input module 202 may be also used for receiving other feedback from the user systems and, for example, for uploading advertisement content from the third party advertisement server. The cloud gaming environment system 200 may include a processing module 204 for providing a gaming software configured to display a third party advertisement in a cloud gaming environment, identifying an interaction level of one or more users with the third party advertisement while one or more users interact with the cloud gaming environment, and determining a fee payable by a third party based on the interaction level of the one or more users with the third party advertisement. Processing module 204 may be also employed to execute other instructions associated with advertising product and services within a cloud gaming environment.

The cloud gaming environment system 200 may include memory 206, such tangible computer readable memory. Various examples of such memory are described further below with reference to FIG. 4. Memory 206 may be used to store gaming software and other instructions as well as advertisement content. The cloud gaming environment system 200 may also include output module 208 for displaying the third party advertisement associated with the product or service.

Figures 3, 4:
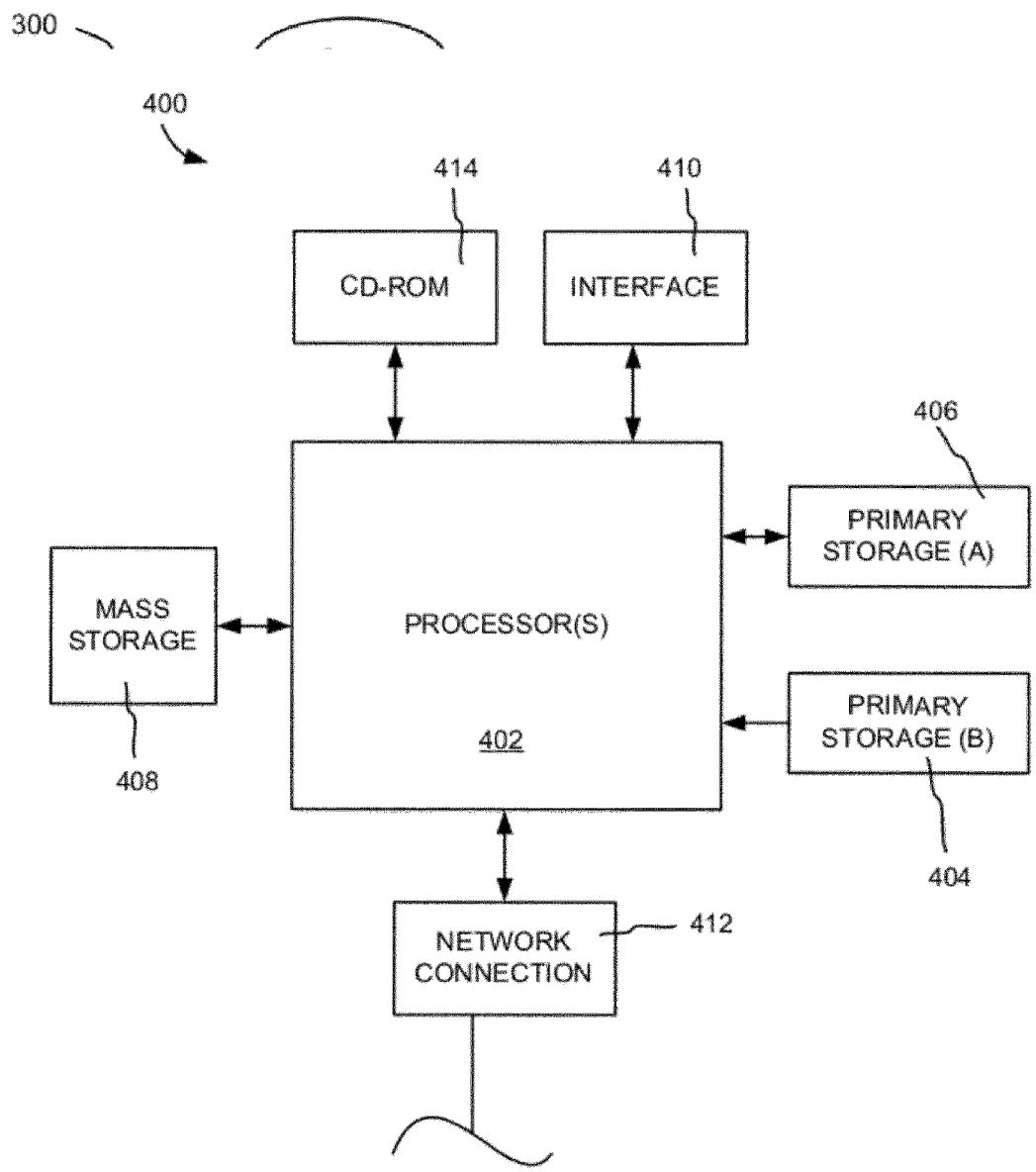
FIG. 3 is a flow chart illustrating a method for advertising products and services within a cloud gaming environment, in accordance with certain embodiments.
FIG. 4 illustrates an example of a computer system, in which various embodiments may be implemented.

FIG. 3 is a process flowchart corresponding to a method 300 for advertising products or services within a cloud gaming environment, in accordance with certain embodiments. This method may also involve selling products and services within the environment by directing its users to a different environment or performing transactions right in the environment.

Figure 5:
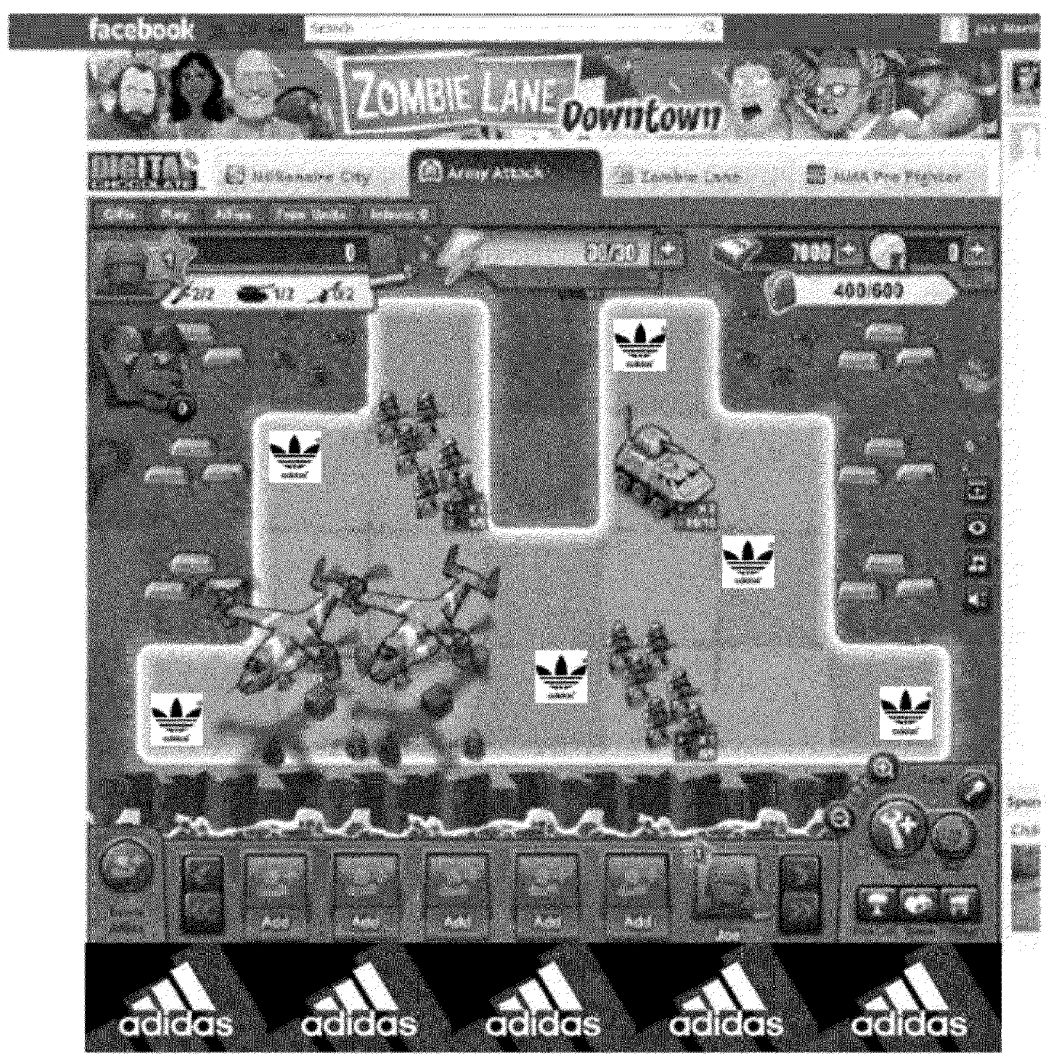
FIG. 5 illustrates an example of a gaming interface.

Method 300 may commence with operation 302 during which a gaming software configured to display a third party advertisement in the cloud gaming environment is provided. The gaming software may provide a gaming interface via the Internet and/or any other communication network to one or more users. The gaming interface allows these users to play online games against each other and/or against virtual opponents. Any types of games or cloud gaming environments may be used. FIG. 5 is an illustrative example of one such cloud gaming environment.

The third party advertisement is associated with products or services provided by a third party and carry some form of identification of these products or services or a party that provides these products and services. For example, advertisement objects may include trademarks of the brand owners and/or description of the product or services. It may include various forms of multimedia, such as text, video, audio, animation, image, flash, and pop up.

Objects corresponding to the third party advertisement may be positioned within the cloud gaming environment such that users can view these advertisement objects and, in certain embodiments, interact with these advertisement objects. Some examples of advertisement objects include banners and pop-up screens. For example, pop-up screens may be used to provide additional challenge for users while they are playing the game. Specifically, when a user plays the game, a pop up screen may appear partially or fully blocking the gaming interface. The user may need to provide some input into the pop up screen before proceeding forward with the game. The time pressure of the game may help to conduct specific surveys that may benefit from spontaneous answers generated by users while playing the game. This survey information may be then used to provide specific product or service offering to the user.

In the same or other embodiments, the third party advertisement may be presented on a timed screen displayed in the cloud gaming environment in between two gaming intervals, at the end of the game, or before the game starts. For example, a game may include some waiting periods, i.e., when the users are not actually playing. During this period, the user may be presented with the third party advertisement, which may be in the static, dynamic, and/or interactive forms as explained above. One such period may be prior to initiating the game, for example, while some users are waiting for other users to join the game. Another such period may be before announcing the winner at the end of the game. Further, the game may be periodically stopped for displaying the third party advertisement. During these periods, the users may still focus on the screen because the game may commence at any moment, i.e., a duration of the third party advertisement display may be unknown to the users and the game may restart after some longer periods in some instances and some shorter periods in other instances.

The third party advertisement may be part of interactive gaming objects. For example, advertisement may be placed on obstacles that users have to navigate around (e.g., walls, stones). In the same or other embodiments, advertisement may be placed on targets (e.g., shooting targets, enemy objects) or weapons (e.g., tanks, guns, bombs). In general, third party advertisement placement on interactive gaming objects may be determined based on type and nature of the game. The goal of this placement to increase interaction levels of the users with the third party advertisement. In this sense, associating the third party advertisement with the targets may be somewhat valuable. Targets may be both "positive" targets that users should try to reach and "negative" targets that users should try to avoid. A brief example may help to understand how third party advertisement may be integrated in these types of interactive gaming objects. For example, a game involves a simple shooting game with multiple targets appearing on the screen. Prior to initiating of the game, the user identifies that he or prefers COCA COLA® to PEPSI COLA®. This preference is then reflected in the targets that the user has to hit and corresponding rules. For example, targets may include generic targets each corresponding to a single point when hit. The targets may also include targets bearing COCA COLA® logo, each corresponding to multiple bonus points when hit, and targets bearing PEPSI COLA® logo, each corresponding to negative points when hit. Therefore, the user should try to hit all COCA COLA® targets and avoid all PEPSI COLA® targets. Upon reaching a certain criteria (e.g., hitting a certain number of COCA COLA® targets and/or getting a certain number of the game points), the user may receive a prize, e.g., a can of COCA COLA® drink.

Method 300 may proceed with operation 304 during which a user interface containing selectable options are presented to users. For example, a user may have been shopping for a product item or service. Upon selecting this product item or service for purchase, the user may be presented with an option to buy this product item or service or to enter a game to win this product or service. These may be mutually exclusive options. However, the user may be assured that he or she will still have an option to buy this product after the game if he or she does not win the game, for example, at the discounted price. This discounted price option may further stimulate the user to play the game rather than proceeding with simply purchasing the product. The third party providing products and services may be incentivized to offer users to win its products or services rather than simply selling them for variety of reasons primarily because of advertisement exposure created in the cloud gaming environment. For example, a user may not be ready to purchase the product, at least initially. At the same time, the user may be willing to play the game and try to win the product. While playing, the user is exposed much advertisement in various different manners and may be much more willing to purchase the product after the game even if he or she did not win the product in the game. Furthermore, a user may play the game to win a small auxiliary product item, such as remote control, while being exposed to advertisement of larger items, such as game consoles, TVs, various types of players. Even though the third party may forgo some money associated with the costs of this remote, in the course of the game, a sufficiently large number of users are exposed to third party advertisement and be motivated to purchase large ticket items thereby justifying the costs of this remote control.

In the same or other embodiments, users may be charged a fee for playing the game, which may offset some or full costs of the price. For example, a cost of entering the game may be a predetermined portion of the product or service. This predetermined portion may be constant or changed depending on the number of player entering the game. In certain embodiments, the entire entrance fee or portion thereof may be refunded at the end of the game depending on the level of interaction of this particular player with the third party advertisement or how successful the user was in winning the game. For example, before a user can enter a cloud gaming environment, a user may be presented within an interface indicating a fee amount and payment interface to enter payment information, e.g., credit card information. Other payment methods, such as PayPal, may be used as well.

Method 300 may proceed with operation 306 during which one or more requests are received from one or more users to activate the gaming software. A request may be in the form of selection of a particular field among multiple options as described above, upon reaching a particular URL, and various other forms of initiating the cloud gaming environment. In certain embodiments, a user may enter the cloud gaming environment immediately upon sending his or her requests. In other embodiments, a user may have a period of time before he or she is allowed into the cloud gaming environment. This period of time may have some predetermined duration or a variable period of time, e.g., a user may wait until a certain minimal predetermined number of requests from other users are received. A third party may set a minimum number of players for each game to make the game more interesting and/or to increase the level of interaction with the third party advertisement, i.e., more users correspond to more interaction. While one or more users are waiting for initiating of the cloud gaming environment, the third party advertisement may be displayed. The user may get certain interaction points based on period of time that the user was exposed to the third party advertisement.

Method 300 may continue with operation 307 during which requests from one or more users are accepted or denied. In certain embodiments, acceptance may be determined based on user previous interaction with the third party advertisement. For example, a user may have an associated advertisement bank in which the user collects advertisement interaction points for one or more advertisers/third parties. A third party may then select the users with a certain number of particular sets points or overall points. It should be noted that these points of one user may be associated with different advertisers/third parties. Another criteria for accepting or denying users' request may be users previous shopping patterns (e.g., which products the user previously purchased) and/or navigation patterns (e.g., which website the user came from).

Method 300 also involves displaying the third party advertisement associated with the product or service during operation 308. Various examples of the third party advertisement are presented above. Further, as explained above the third party advertisement may be displayed before one or more users enter the cloud gaming environment, while these users are within the environment, and upon exiting the environment. For examples, the third party advertisement may be present on the gaming objects, such as obstacles, targets, or players avatars. In certain embodiments, method 300 involves removing a user from the gaming requirement during operation 309. This operation may be invoked with when the user does not meet a predetermined interaction level with the third party advertisement while in the cloud gaming environment or according some other criteria.

Method 300 may also involve identifying an interaction level of the one or more users with the third party advertisement during operation 310. The interaction level may be identified for each user individually and may be used, for example, to determine a winner of the game, i.e., the user with the highest level of interaction. In the same or other embodiments, a combined interaction level is determined for the entire group of users. For purposes of this document, an interaction level is determined as visual and audio exposure to the third party advertisement as well as user's action as result of this exposure. Some factors that may be used to estimate interaction level include a number of times the one or more users clicked on or otherwise selected one or more fields associated with the third party advertisement and a number of times the one or more users observe one or more corresponding player objects from interacting with the one or more fields associated with the third party advertisement. Additional factors include a number of times the one or more users sought additional advertisement information, duration of the one or more users were present in the cloud gaming environment, a number of the one or more users. Various other factors to evaluate effects of marketing on users may be used as well. Different factors may be assigned different weight to more precisely tailor the marketing model. Individual or combined interaction levels may be determined continuously or upon reaching some points in the cloud gaming environment.

In certain embodiments, an interaction level is a single value that may be used to evaluate a user or a group of users. As explained above, the interaction level may be used to determine a winner and present prizes. In more complex marketing models, the interaction level may include comprises multiple factors such that each factor is independently evaluated, for example, to determine the fee by the third party to the provider of the cloud gaming environment. The concept of interaction level may be specifically designed to increase exposure to the third party advertisement among users of the cloud gaming environment and measure the effect of this advertisement on these users.

Method 300 may proceed with determining a fee payable by a third party based on the interaction level of the one or more users with the third party advertisement during operation 312. For example, a payable fee may be proportional to the interaction level, e.g., more players being exposed to more advertising material for longer periods of time would drive more revenues. As explained above, different factors may be used in determining the interaction level. In a specific example, the interaction level is measured by value of purchased good and services. In these situations, the payable fee may be determined based on a predetermined percentage of a gross purchase value completed by the one or more users. For example, a provider of the cloud gaming environment may collect 0.1% of the total sales.

In certain embodiments, method 300 also involves identifying one or more winners during operation 314. The winner may be a user with a highest interaction level with the third party advertisement. In the same or other embodiments, the winner may be user who achieved some other highest score in the game. One or more winners identified during operation 314 may then be awarded one or more prizes during operation 316. Values and types of these prizes may be determined based on user's individual interaction level with the third party advertisement. In this case, the fee payable by the third party may be determined based on a value of the prize. In other embodiments, the winner is determined randomly.

FIG. 4 illustrates a computer system that may be configured or designed for performing various operations describe above, in accordance with certain embodiments. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers and microprocessors such as programmable devices (e.g., CPLDs and FPGAs) and unprogrammable devices such as gate array ASICs or general purpose microprocessors. Primary storage 404 may act to transfer data and instructions uni-directionally to the CPU and primary storage 406 is used typically to transfer data and instructions in a bi-directional manner. Both of these primary storage devices may include any suitable computer-readable media such as those described above. A mass storage device 408 is also coupled bi-directionally to CPU 402 and provides additional data storage capacity and may include any of the computer-readable media described above. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 may also be coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications network using an external connection as shown generally at 412. With such a connection, it is contemplated that the CPU might receive information from the network, or might output information to the network in the course of performing the operations described herein.

The example embodiments described herein may be implemented in an operating environment including software installed on a computer, in hardware, or in a combination of software and hardware.

FIG. 5 illustrates an example of a gaming interface 500 with a social network, such as FACEBOOK®. The game interface includes various advertisement objects (shown as ADIDAS® logos) right in the playing field and underneath the playing field. In order to play the game, users may need to interaction with some of these advertisement objects, such as pick additional ammo, life/health points, game points, etc. For example, a user may need to navigate its troops, tanks, and helicopters to ADIDAS® logos to increase its interaction level. A logo belonged to a competitive brand (e.g. NIKE®) may be used as a shooting target. Overall, integration of advertisement objects into the game may be implemented in such a way that at the end users have greater affinities to products and services of the third party advertisers.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method for multimedia capture, encrypting, advertising and selling products or services via cloud gaming environments, the method comprising:
receiving, by one or more processors, a first input from a user; based on the input, initiating one or more sensors to capture multimedia to obtain captured multimedia; receiving, by the one or more processors, a second input from the user; analyzing, by the one or more processors, data associated with the first and second inputs; the first and second inputs being received on the wearable digital device by touching a touch display and holding a touch contact of a user finger or stylus for a predetermined time, wherein the touching comprises the first input and a release after the predetermined time comprises a second user input, the analyzing including calculating time between the first user input and the second user input; based on the analysis, selecting one or more multimedia types for recording from the captured multimedia based on predetermined rules associated with the predetermined time; sending a command to a sensor of the wearable digital device to capture video to memory of the selected multimedia type based on the predetermined rules; modify the one or more recorded multimedia types, by a cloud-based voice changing unit, to obtain one or more modified multimedia types; encrypting, via an encryption unit one or more of the recorded multimedia types and the modified multimedia types to prepare the one or more multimedia types for sending; and storing the one or more multimedia types in a memory operable, wherein the cloud-based voice changing unit is coupled to a payment processor coupled; providing an integrated interface for selection of an activity mode, wherein the activity mode includes a messaging mode, a calling mode, and a one-touch payment mode; receiving the selection of the activity mode via the integrated interface from a user; if the messaging mode is selected, receiving a message from the user, the message being sent to a recipient via a data network; and if the calling mode is selected, initiating a data network call on a call request of the user; and if the one-touch payment mode is selected, transmitting a payment request to a financial organization, wherein the payment request is generated using data of an actual page on the mobile and wearable device; and encrypting the payment request associated with the one-touch payment mode to obtain an encrypted payment request, wherein the encrypted payment request is decryptable by an ephemeral messaging, one-touch payment, and multimedia application of a mobile and wearable device of the recipient, wherein the encrypted payment request is removed from the mobile and wearable device of the recipient after the encrypted payment request is optically read; wherein the ephemeral messaging, one-touch payment, and multimedia application is associated with an application protocol, the application protocol being integrated into a communication platform; and receiving, from the user, a registration request to register the user in a mobile payment service, wherein the user sends the registration request via a mobile payment application associated with the mobile and wearable device, the mobile payment application providing at least a free VoIP service and a free Over-the-Top (OTT) service; securing the mobile and wearable device comprises via a band to a part of a human body, the part of the human body including a wrist, an arm, a neck, a bead, a leg, a waist, an ear, and a finger, securing, via the band, the mobile and wearable device under, within or on clothing, including a within the band, a rechargeable battery configured to power the mobile and wearable device; operably connecting a database to the wearable digital device; and wherein database stores financial information of the user providing during user registration with the system; wherein the receiving of the selection of the activity mode includes a voice command, a haptic interaction with a touchscreen of the mobile and wearable device, and a move command, wherein the mobile and wearable device comprises one or more haptic control elements to control operation or functions of the mobile and wearable device, and controlling access to the mobile and wearable device by one or more of the following: a password, a Personal Identification Number code, and biometric authorization, the biometric authorization including fingerprint scanning, palm scanning, face scanning, and retina scanning, wherein the scanning is performed using the one or more biometric sensors, wherein the one or more biometric sensors include sensors for sensing a command for the one-touch payment mode, the sensing shown on the display, the mobile and wearable device further comprising a fingerprint reader configured to scan a fingerprint, the scanned fingerprint being matched to one or more approved fingerprints, wherein access to the mobile and wearable personal digital is granted based on the matching; wherein the mobile and wearable device further comprises a camera configured to capture one or more codes, the one or more codes including electronic key data, a link to a web-resource, a payment request, and advertising information, wherein the one or more codes include barcode, a linear dimensional code, a two-dimensional code, a snap tag code, and a QR code; wherein the mobile and wearable device obtains information about a payment system of the user, wherein the mobile and wearable device generates and displays a barcode that encodes user payment information, scanning and processing the barcode at a checkout counter to retrieve the user payment information from a database of a payment processing system, the user payment information being used to transfer funds between the user and the recipient, wherein the recipient is a merchant; associating the mobile and wearable device is associated with an electronic payment card configured to act as one or more of a smart card, a proximity card, an integrated circuit card, a magnetic strip card, and an electronic payment card, the electronic payment card storing card data of one or more debit cards, credit cards, gift cards, loyalty cards, prepaid cards, bank cards, identity cards, and membership cards, wherein the electronic payment card is configured to attach to the mobile and wearable device; wherein the method further comprises scanning the code, the code being present on a one-touch QR code invoice, the one-touch QR code invoice storing one or more of invoice data, monetary amount summary, product data, service data, merchant data, invoice number, and amount to be paid, the one-touch QR code invoice being associated with one or more of an invoice, a credit note, a debit note, a pro forma invoice, and an advance invoice; and storing one-touch payment information in the mobile card wearable device associated with the user, wherein the user activates the one-touch payment mode by holding the mobile and wearable device near a contactless reader card activating a one-touch payment icon on the mobile and wearable device and makes a secure payment, authorized in part when the location of the payment matches with a determined location of the device, wherein the method comprises, the advertising and selling of products and services via the cloud gaming environments and the multimedia application is associated with an application protocol, the application protocol being integrated into a communication platform, the method further comprising, on the mobile and wearable digital device: providing a gaming software configured to display a third party advertisement in the cloud gaming environment, wherein the third party advertisement is associated with the products or services provided by a third party; receiving, via a user interface associated with a shopping website, a selection of products or services by one or more users to obtain selected products or selected services; based on the selection, providing, by the user interface, to the one or more users an incentive to enter the cloud gaming environment to win the selected products or the selected services receiving one or more requests from the one or more users to activate the gaming software; displaying the third party advertisement, the third party advertisement being associated with the selected products or the selected services; identifying an interaction level of the one or more users with the third party advertisement while the one or more users interact with the cloud gaming environment, wherein the identifying of the interaction level includes: determining presence of one or more factors selected from the group comprising at least: a number of times the one or more users clicked on or otherwise selected one or more fields associated with the third party advertisement; and a number of times a pop up advertisement is displayed to the one or more users, the pop up advertisement including the third party advertisement that at least partially blocks a gaining interface in the cloud gaming environment before receiving a user input, the user input being provided by the one or more users in response to displaying the pop up advertisement to the one or more users; assigning weights to the one or more factors, a weight being assigned to each of the one or more factors; calculating the interaction level, the calculating including summarizing the weights of the one or more factors; and determining a fee payable by the third party based on the interaction level of the one or more users with the third party advertisement.

2. The method of claim 1, wherein the interaction level is a single value determined based on one or more values corresponding to the one or more factors.

3. The method of claim 1, wherein the gaming software is hosted by a third party website associated with the third party, the users having an option of buying the products or services directly or entering a game to win the products or services by paying a fee to the third party.

4. The method of claim 1, wherein the interaction level comprises multiple factors, wherein each of the multiple factors is independently evaluated to determine the payable fee.

5. The method of claim 1, wherein the payable fee is determined based on a predetermined percentage of a gross purchase value completed by the user.

6. The method of claim 1, wherein the third party advertisement comprises interactive gaming objects.

7. The method of claim 1, wherein the third party advertisement comprises a timed screen displayed in the cloud gaming environment in between two gaming intervals.

8. The method of claim 1, further comprising: identifying a winner among system users; and awarding the winner a prize associated with the products or service.

9. The method of claim 8, wherein identifying the winner comprises determining a system user with a highest interaction level with the third party advertisement and/or randomly.

10. The method of claim 8, wherein the fee payable by the third party is determined based on a value of the prize.

11. The method of claim 8, wherein a value of the prize is determined based on a user individual interaction level with the third party advertisement.

12. The method of claim 8, wherein the prize is a product item or service associated with the third party advertisement.

13. The method of claim 8, wherein the prize is a discount applicable to any one of a plurality of products and/or services associated with the third party advertisement.

14. The method of claim 1, further comprising accepting the one or more requests from the one or more users based on each user previous interaction with the third party advertisement.

15. The method of claim 1, further comprising removing a user from the cloud gaming environment if the user does not meet a predetermined interaction level with the third party advertisement.

16. The method of claim 1, wherein the cloud gaming environment is initiated upon reaching a certain minimal predetermined number of requests from the one or more users to activate the gaming software.

17. The method of claim 16, wherein the third party advertisement is displayed prior to initiating the cloud gaming environment.

18. The method of claim 1, further comprising providing a user interface to the one or more users indicating mutually exclusive options selected from the group consisting of: buying the products or service and entering the cloud gaming environment to win the products or service.

19. The method of claim 18, wherein the gaming software is played in one or more formats.

20. The method of claim 18, wherein the fee is turned into a coupon code or a coupon credit to be used towards a further fee.

21. The method of claim 18, wherein the one or more users are charged a fee for entering the cloud gaming environment to win the products or services.

22. The method of claim 21, wherein the fee corresponds to a portion of a value of a product item or a service associated with the third party advertisement.

23. The method of claim 22, further comprising identifying a winner among the one or more users and offering a refund of the fee to the winner.

24. The method of claim 23, wherein a portion of the fee is payable to a game provider.

25. The method of claim 24, wherein the one or more users invited one more friends to play games.

26. The method of claim 1, wherein the gaming software comprises the third party advertisement and provided from a third party advertisement server.

* * * * *